United States Patent [19]

Hunt

[11] 3,968,741
[45] July 13, 1976

[54] COOKING OIL RECOVERY SYSTEM

[76] Inventor: Arthur John Hunt, 332 N. Halifax Drive, Ormond Beach, Fla. 32074

[22] Filed: Dec. 30, 1974

[21] Appl. No.: 537,256

Related U.S. Application Data

[63] Continuation-in-part of Ser. No. 266,222, June 26, 1972, abandoned.

[52] U.S. Cl. ............................. 99/330; 99/408; 210/186; 210/DIG. 8
[51] Int. Cl.² ....................................... A47J 37/12
[58] Field of Search......... 210/39, 96, 167, 184–186, 210/197, 203, DIG. 8; 99/342, 407, 408, 330

[56] References Cited
UNITED STATES PATENTS

| | | | |
|---|---|---|---|
| 722,832 | 3/1903 | Fresenius | 99/118 R |
| 2,063,140 | 12/1936 | Allison | 210/96 |
| 2,075,070 | 3/1937 | Upton | 210/18 S |
| 2,122,260 | 6/1938 | Moore et al. | 99/118 R |
| 2,668,622 | 2/1954 | Irvine et al. | 210/186 |
| 2,781,301 | 2/1957 | Payne | 210/39 |
| 3,210,193 | 10/1965 | Martin | 99/330 |
| 3,608,472 | 9/1971 | Pelster et al. | 210/167 |
| 3,646,882 | 3/1972 | Keating | 210/167 |
| 3,670,895 | 6/1972 | Goodpasture | 210/167 |
| 3,759,388 | 9/1973 | Thomason | 210/167 |

Primary Examiner—Thomas G. Wyse
Attorney, Agent, or Firm—Duckworth, Hobby, Orman, Allen, & Pettis

[57] ABSTRACT

Continuously flowing cooking oil is recovered by passing the oil through a series of filters, one of which contains a carbonaceous material, such as bone char. The oil may be simultaneously heated during each filtering step, and the acidity of the oil may be reduced to avoid rancity.

5 Claims, 4 Drawing Figures

COOKING OIL RECOVERY SYSTEM

This is a continuation-in-part of application Ser. No. 266,222 filed June 26, 1972, now abandoned.

BACKGROUND OF THE INVENTION

1. Field of the Invention

The present invention relates to cooking oil filtering and recovery systems.

2. Description of the Prior Art

Restaurants consume large quantities of cooking oil in food preparation. In particular, most restaurants, especially those in the so-called "fast food" industry, employ a technique known as "deep-fat frying" which requires a large amount of cooking oil for each cooking operation.

After the cooking oil in a deep-fat fryer has been used a limited number of times, the oil tends to become dirty and rancid, causing undesirable odors and unacceptable food product. This is due in part to the oxidation and polymerization of the oil, caused by cooking at elevated temperatures for extended periods of time. Further, certain fatty acids such as palmitic, oleic, amino, and stearic acids, are imparted into solution with the cooking oil from the foods cooked. The cooking oil more readily becomes rancid when the acidity of the oil rises to a certain level. Another difficulty is experienced with hydrogenated fats when used in cooking, in that such fats tend to polymerize and decompose once melted and then allowed to reharden.

Several systems have been developed for filtering cooking oil and extending the period for which the oil may be used. See, for example, U.S. Pat. No. 3,648,595. Many of these systems simply filter the solid materials in the oil but do not remove most of the odor-causing components which are in the solution with the cooking oil.

SUMMARY OF THE INVENTION

The present invention comprises a system for recovering cooking oil in which the oil is passed through at least one filter, which filter contains a carbonaceous material.

In one embodiment, the acidity of the cooking oil is reduced, in order to neutralize the fatty acids in solution with the oil.

THE DRAWING

DETAILED DESCRIPTION

Figure 1:
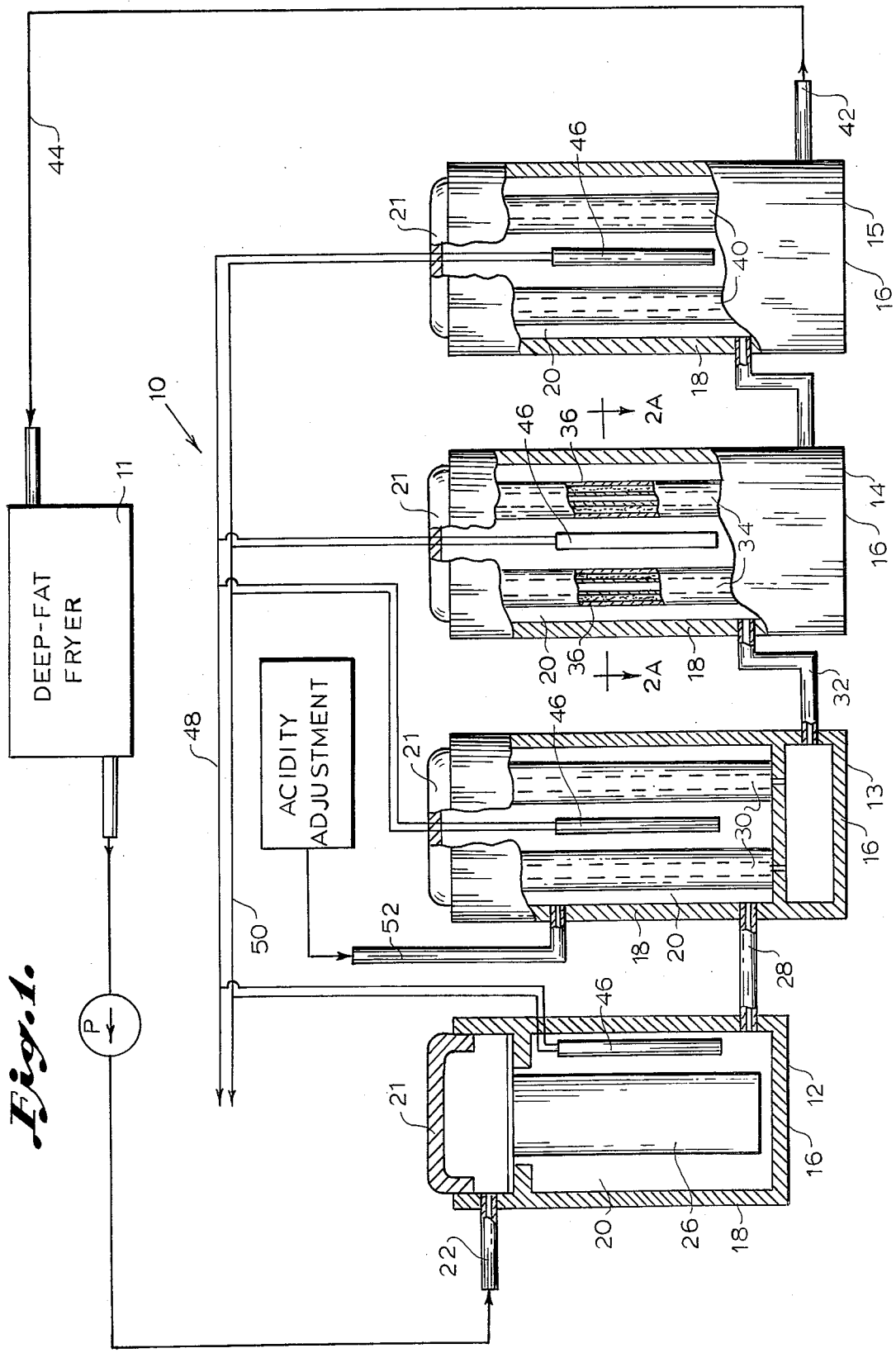
FIG. 1 is a side view, partially in cross-section, of a cooking oil recovery system in accordance with the present invention.

A conventional cooking oil device, such as a deep-fat fryer 11, is shown by block diagram in FIG. 1. For purposes of discussion it will be assumed that the fryer 11 is filled with a quantity of cooking oil which is to be filtered.

A cooking oil recovery system embodying the present invention is referred to generally as 10 in the drawing. This system 10, in this example, includes four enclosed filtration compartments 12, 13, 14 and 15. Each compartment 12–15 includes a floor 16 and a peripheral wall 18 which defines a chamber 20 therein. A cover 21 is fitted over each compartment 12–15. A first one of the compartments 12 includes an input nozzle 22 extending through the wall 18, preferably at the top thereof. Conventional piping, shown by a solid line 24 in the drawing, continuously feeds the cooking oil out of the fryer 11 and into the first filtration compartment 12 via the input nozzle 22. Force for the continuous feed of oil is provided by a pump (P). Preferably, a positive displacement pump is employed, such that the pump's pressure gauge will "redline" when a large back-pressure develops. This notifies the operator that the flow of oil is impeded and the filters, described below, must be replaced.

A first filter 26 is disposed within the first filtration compartment 12 underneath the input nozzle 22, such that the continuously flowing cooking oil passes through the filter. Preferably, the first filter 26 is one of a variety of disposable paper filters, or is a cloth filter which may be cleaned and reused. Suitably, the first filter 26 has a mesh on the order of 10 microns so that relatively large solid objects, such as food particles and the like, are filtered from the cooking oil at this point.

A connecting pipe 28 provides means for passing the cooking oil out of the first filtration compartment 12 and into a second one of the filtration compartments 13, where a second filter arrangement 30 is disposed therein. The filter arrangement 30 is similar to a third filter arrangement 34, which is shown in more detail in FIGS. 2A and 2B, and described with reference thereto.

Suitably, the filter arrangement 30 has a mesh of about 5 microns, in order that most of the additional solid objects passing through the first filter 26 will be removed from the cooking oil at this point.

The oil is pumped into a drain pipe 32 which extends into a third one of the filtration compartments 14, and into the chamber 20 in which the third filter arrangement 34 is disposed. The third filter arrangement 34 will now be described in detail with reference to FIGS. 2a and 2b.

Figure 2A:
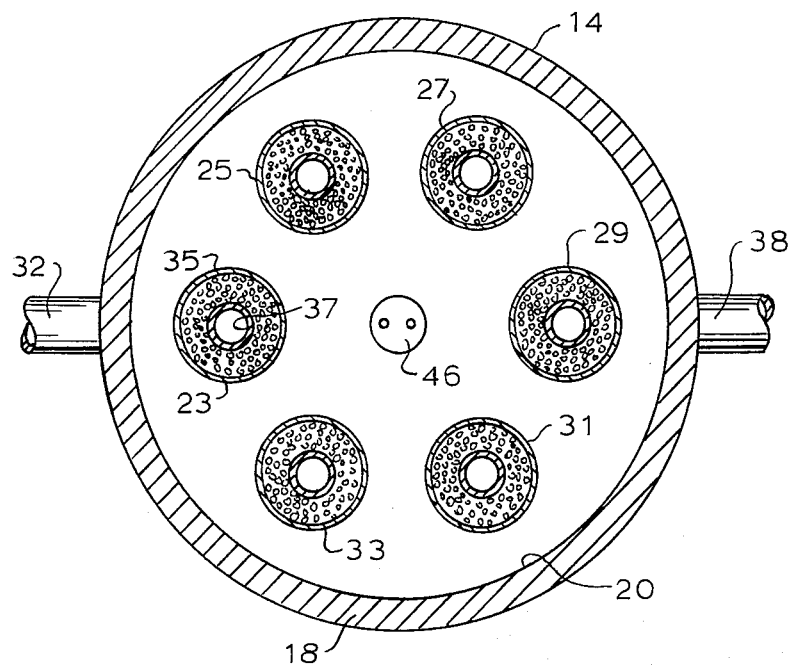
FIG. 2A is an enlarged sectional view taken along line 2A-2A FIG. 1, to show the filtration compartment 14 in this contents.
Figure 2B:
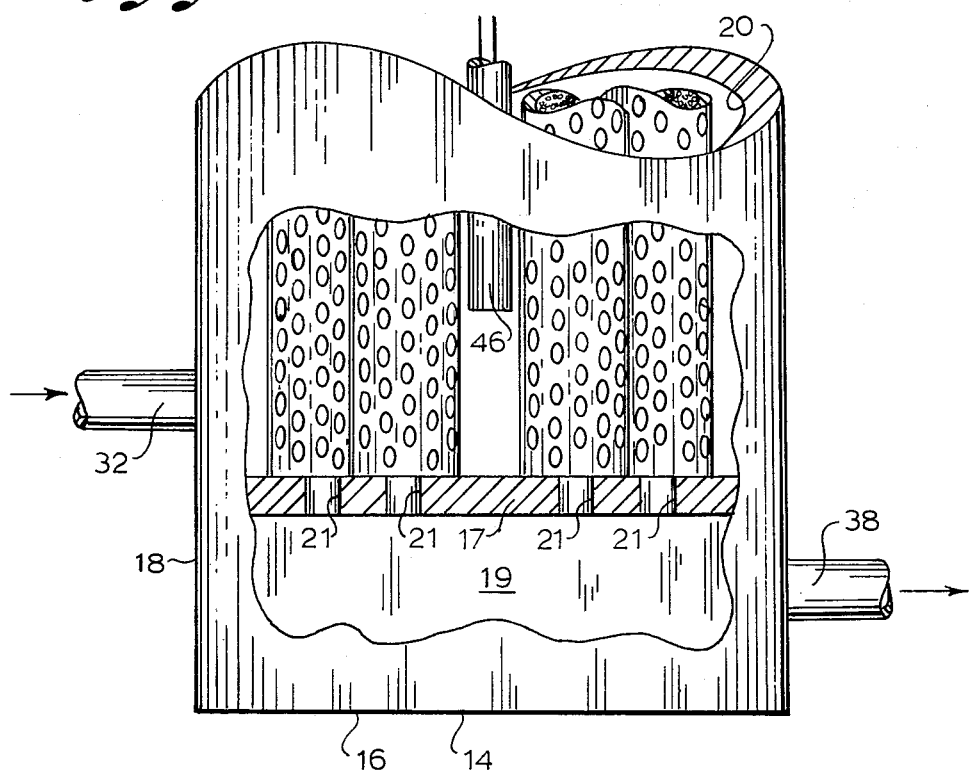
FIG. 2B is an enlarged fragmentary side elevation of such a filtration compartment 14, with portions broken away to show its contents; and –.

Noting FIGS. 2A and 2B, the third filtration compartment 14 includes a drain plate 17 mounted normal to the wall 18 and across the bottom portion of the chamber 20 and spaced from the floor 16. That portion of the chamber 20 between the drain plate 17 and the floor 16 comprises a drain reservoir 19. The drain plate 17 includes a plurality of drain pipes 21 therethrough, which communicate with the drain reservoir 19.

A plurality of cylindrical filter elements, such as the six elements, 23, 25, 27, 29, 31 and 33 shown in FIG. 2A, are disposed within the chamber 20 of the filtration compartment 14 and supported by the drain plate 17. Noting FIG. 2A, each filter element 23, 25, 27, 29, 31 and 33 includes an outer filter shell 35 which surrounds a hollow core 37; each filter is disposed in the chamber 20 such that each hollow core 37 is fitted over a corresponding drain pipe 21.

Each filter in the third filter arrangement 34 preferably comprises a removable cartridge type filter, which can be snugly fitted about each drain pipe 21 extending upward into the chamber 20 of the third filtration compartment 14. As shown by the arrows in FIG. 2B, the oil passes through the filter cartridges, down the hollow core 37 and into the drain reservoir 19 via the drain pipes 21.

The third filter arrangement 34 is similar in construction to the second filter arrangement 30 and a fourth filter arrangement 40, described below, except that the third filter 34 includes an activated carbonaceous material 36. (Note FIG. 1) The second and fourth filters 30 and 40 may comprise any type of cartridge filter which is capable of withstanding the elevated temperatures of the cooking oil.

While a number of carbon-containing compounds are suitable for use in the filter 34, it has been found that activated bone char is particularly superior in filtering the various odiferous components which are normally found in cooking oil after use. While the reasons for the superior filtration capabilities of activated bone char that are not completely understood, it is believed that the high oxygen and calcium phosphate contents of activated bone char may achieve these results.

Referring again to FIG. 1, another drain pipe 38 passes the oil out of the third filtration compartment 14 and into a fourth filtration compartment 15 in which a fourth filter arrangement 40 is disposed.

The fourth filter arrangement 40 likewise is similar to that shown in FIGS. 2A and 2B, except that it preferably comprises a plurality of filters having a mesh of about 1–3 microns, in order to provide a final "polishing" filtration of the cooking oil. Another drain pipe 42 passes the cooking oil out of the fourth filtration chamber 15, and is connected to conventional piping (shown by a solid line 44) to return the cooking oil to the fryer 11.

The system 10, as described thus far, is useful for those types of cooking oil that remain in the fluid state at room temperatures. However, certain types of cooking oils, especially those derived from hydrogenated fats, thicken or congeal at room temperatures. When such oils are to be filtered, an electrical heating element 46 is mounted in each filtration chamber 20, in order to keep the oil at an elevated temperature such that it will remain in the fluid state. Electric lines 48 and 50 provide means for supplying current to all of the heating elements 46.

A further improvement in the recovery of the cooking oil may be accomplished by simultaneously reducing the acidity of the oil during the filtration process. For example, is has been found that the addition of about 0.65 milliliters of potassium hydroxide for each 5-gallons of liquid cooking oil will reduce the acid content to about 1 percent, or less. Similarly, the addition of about 0.65 milliliters of potassium hydroxide per 40-50 pounds of solid fats has been found sufficient to achieve the desired reduction in acidity for those types of cooking fats. The acidity-reducing medium, such as the potassium hydroxide mentioned above, can be added anywhere in the filtration process. Preferably, however, it is added prior to the activated bone char filter 34, as by introduction into the second filtration compartment 13 by means of a flow pipe 52.

As will be appreciated by those skilled in the art, the recovery system 10 continuously filters the cooking oil during operation of the fryer 11. Further, the activated carbon-containing filter 36 greatly reduces the amount of odor-causing solutes in the oil. While a four-step filtration and acidity reduction system is specifically described above, various other filter steps may be added or deleted as necessary within the framework of this invention.

Figure 3:
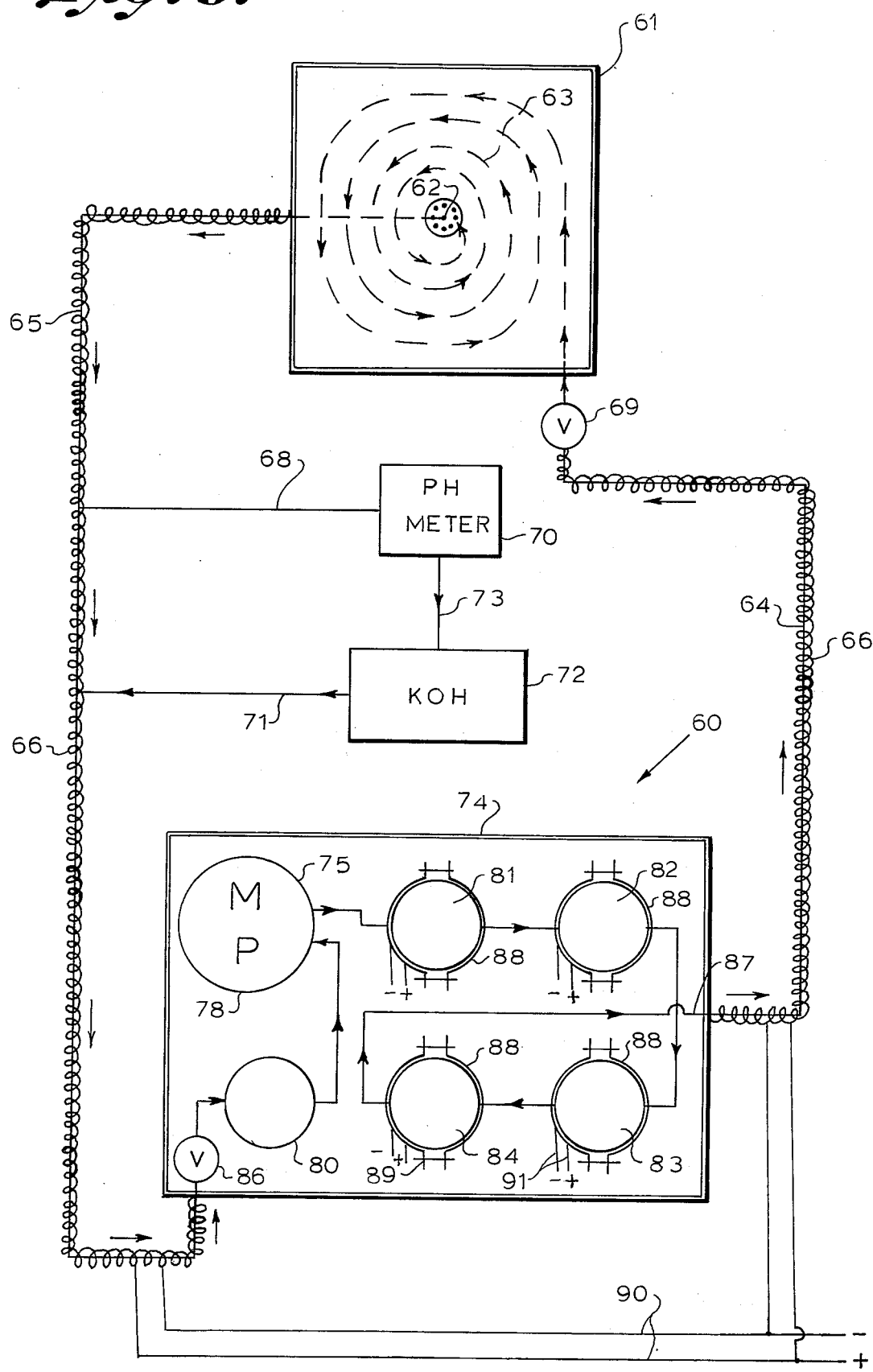

Referring now to FIG. 3, a diagramtic view of a second embodiment is illustrated, having a cooking container 61 illustrated with four walls and a bottom and having a drain 62 in the bottom thereof. Cooking oil in the container passes through the drain 62 and through the pipes 65 into the filtering unit compartment 60 having walls 74 where it is filtered and passes through return line 64 back into the cooking container 61 through one wall but adjacent a second wall so as to form a vortex or circular pattern in the movement of the cooking oil in the container 61 thereby sweeping crumbs and other trash on the bottom of the container 61 into motion and eventually into the drain 62. The drain line 65 and return line 64 are wrapped with heating coils 66 so that the cooking oil in the container 61 is heated as it leaves the container 61 and on its return, as well as being heated during its passage through each of the filters 81, 82, 83 and 84. Each filter surrounded with a heating band 88 which is a heating element for heating that particular filter. The heating is important to maintain the viscosity of the oil so as not to collapse the filter elements. The heating element 66 is a commercially available tape which wraps around the pipes and is connected to an electrical source 90 for maintaining the heat as it flows through the pipes.

A pH meter 70 is connected to the line 65 by probe 68 for measuring the pH of the cooking oil for determining when to add an acid reducing agent or potassium hydroxide (KOH) by the acid reducing metering system 72 through a connecting pipe 71. The pH meter 70 is a standard commercially available meter for continuously measuring the pH and may actuate the acid reducing metering system 72 by an electrical connection 73 actuated by the pH meter 70 upon making a predetermined reading on the meter 70. The filter system 60 encased in the wall 74 has a valve 86 at the input from line 65 past restrainer 80 and through a pump 78 driven by motor 75 which then drives the system through solid removing filters and a bone char filter as heretofore described in connection with FIGS. 1 and 2. Each filter is heated by a band 88 connected with electrical lines 91 for electrical resistance heating of the cartridges and the oil passing therethrough. It is important to note that the pump drives or pushes the oil through the filters 81, 82, 83 and 84 rather the pulling with a vacuum. A valve 69 is located at the entrance of the pipe 64 leading into the container 61 to complete the system. It should be clear at this point that a cooking oil recovery system has been provided for revitalizing cooking oil by the filtration, heating and pH control of the cooking oil and by the use of special bone char filters and heating elements which operate under an automatic system. However, this invention is not to be construed as limited to the particular form disclosed herein since these are to be regarded as illustrative rather than restrictive.

I claim:
1. A cooking apparatus comprising in combination:
   a cooking container having container walls and a bottom for holding and heating cooking oil, said cooking container having a drain in the bottom thereof;
   a plurality of filtering elements connected in series for filtering cooking oil passing therethrough;
   a drain line connecting the first filter element in said series to said cooking container drain;
   a return line operatively connecting the last of said series of filter elements to said cooking container;

pump means operatively connected to said cooking apparatus to pump cooking oil from said cooking container through said drain line, filtering elements and through said return line back into said cooking container, the return line being connected to said cooking container through one wall adjacent a second wall thereby causing a circular movement of oil around said cooking container;

drain line heating means attached to said drain line to heat said oil passing thereby;

filter heating means attached around at least one filtering element for heating oil passing therethrough;

acid reducing metering means operatively connected between said drain line and said return line for metering acidity reducing medium to said cooking oil; and ph measuring means for measuring the ph of cooking oil and being operatively connected to said acid reducing metering means for activating said acid reducing metering means when said ph reaches to a predetermined level.

2. The apparatus in accordance with claim 1 in which said filtering elements includes a plurality of filters for filtering solids from said cooking oil followed by a bone char filter for further filtering said cooking oil.

3. The apparatus in accordance with claim 1 in which said drain line, said return line and each filter element has heating means for maintaining the cooking oil at predetermined temperatures.

4. The apparatus in accordance with claim 3 in which said drain line and return line heating means includes heating elements coiled around each line.

5. The apparatus in accordance with claim 4 in which said pump means is connected between said container drain and said filter elements.

* * * * *